(12) United States Patent
Watson, Jr. et al.

(10) Patent No.: US 6,732,105 B1
(45) Date of Patent: May 4, 2004

(54) SECURE AUTHENTICATION PROXY ARCHITECTURE FOR A WEB-BASED WIRELESS INTRANET APPLICATION

(75) Inventors: David M. Watson, Jr., Halfmoon Bay, CA (US); Mark Stantz, San Jose, CA (US)

(73) Assignee: palmOne, Inc., Milpitas, CA (US)

( * ) Notice: Subject to any disclaimer, the term of this patent is extended or adjusted under 35 U.S.C. 154(b) by 284 days.

(21) Appl. No.: 09/917,391

(22) Filed: Jul. 27, 2001

(51) Int. Cl.[7] .................................................. G06F 17/30
(52) U.S. Cl. ....................................... 707/10; 707/104.1
(58) Field of Search ................... 707/3, 4, 10; 345/744; 455/405, 419; 370/352, 354, 400; 705/1; 709/202, 218, 219, 236; 713/201

(56) References Cited

U.S. PATENT DOCUMENTS 6,324,564 B1 * 11/2001 Thielke et al. ............... 709/202
6,397,259 B1 * 5/2002 Lincke et al. ............... 709/236

\* cited by examiner

*Primary Examiner*—Diane D. Mizrahi
*Assistant Examiner*—Apu Mofiz
(74) *Attorney, Agent, or Firm*—Wagner, Murabito, & Hao LLP

(57) ABSTRACT

A method and server system for exchanging data between a hand-held wireless electronic device and another computer system. This system allows a wireless electronic device to securely communicate with an Intranet by verifying two authentication parameters. The first authentication parameter is the device serial number and a password which authenticates the network connection. The second authentication parameter is a user name and password that authenticates the user's access to applications on the Intranet.

21 Claims, 10 Drawing Sheets

608

KEYWORD LOOK-UP TABLE

| KEYWORD | FILEPATH |
|---|---|
| KEYWORD 1001 | FILE PATH 1002 |

| KEYWORD 1 1011 | FILE PATH 1 1012 |
|---|---|

| KEYWORD 2 1021 | FILE PATH 2 1022 |
|---|---|

| KEYWORD 3 1031 | FILE PATH 3 1032 |
|---|---|

FIGURE 10

SECURE AUTHENTICATION PROXY ARCHITECTURE FOR A WEB-BASED WIRELESS INTRANET APPLICATION

BACKGROUND OF THE INVENTION

1. Field of the Invention

The present invention relates to the field of data processing. More specifically, embodiments of the present invention relate to providing a method for a wireless electronic device (e.g., a portable computer system, a palmtop computer system, cell phone, pager or any other hand held electronic device) to connect with authenticated access to Intranet web applications.

2. Related Art

Computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of computer hardware higher, more sophisticated computer software has evolved to take advantage of the higher performance of the hardware, resulting in computer systems today that are much more powerful than just a few years ago.

Other changes in technology have also profoundly affected how people use computers. For example, the widespread proliferation of computers prompted the development of computer networks that allow computers to communicate with each other. With the introduction of the personal computer (PC), computing became accessible to large numbers of people. Networks for personal computers were developed to allow individual users to communicate with each other. In this manner, a large number of people within a company could communicate at the same time with a central software application running on one computer system.

As corporations utilize increasingly distributed and open computing environments, the security requirements of an enterprise typically grow accordingly. The complexity of employee, customer and partner access to critical information, while assuring proper security, has proven to be a major hurdle. For example, many organizations implement applications that allow their external business partners, as well as their own internal employees, to access sensitive information resources within the enterprise. In the absence of adequate security measures, an enterprise may be subject to the risk of decreased security and confidentiality.

As a result, authentication mechanisms are usually implemented to protect information resources from unauthorized users. Examples of network security products include firewalls, digital certificates, virtual private networks, and single sign-on systems. Some of these products provide limited support for resource-level authorization. For example, a firewall can screen access requests to an application or a database, but does not provide object-level authorization within an application or database.

Single Sign-On (SSO) products, for example, maintain a list of resources an authenticated user can access by managing the login process to many different applications. However, firewalls, SSO and other related products are very limited in their ability to implement a sophisticated security policy characteristic of many of today's enterprises. They are limited to attempting to manage access at a login, or "launch level," which is an all or nothing approach that can't implement an acceptable level of security that is demanded by businesses supporting Intranets.

FIG. 1A illustrates a prior art system 100 of a palmtop or "palm sized" computer system 104 connected to other computing systems and an Intranet via a cradle. Specifically, system 100 comprises a palmtop device 104 connected to PC 103, which can be a serial communication bus, but could be any of a number of well known communication standards and protocols, e.g., a parallel bus, Ethernet, Local Area Network (LAN), and the like. PC 103 is connected to server 101 and database 102 by an authenticated network connection. In the prior art system 100, two authentication parameters are achieved to provide a secure connection. First, PC 103 is physically connected to the server 101 to establish a network connection. The physical location of PC 103 is usually sufficient for the network connection to be approved. Secondly, when applications on server 101 are used, the user of PC 103 must provide a user name and password to authorize use. In this configuration, security and authentication is achieved first on the network level by authenticating the user's login name and password or device identification over the network and secondly on the application level by again authenticating the users login name and password.

Similarly, FIG. 1B is a prior art system 105 illustrating a palmtop computer connected to other computer systems and the Internet via a modem or dial up device. Specifically, palm device 104 is connected to modem 106, which can be a serial communication bus, but could be of any of a number of well known communication standards and protocols, e.g., a parallel bus, Ethernet, Local Area Network (LAN), and the like. Modem 106 is connected to server 101 and database 102 by an authenticated dial-up network connection. In the prior art system 105, two authentication parameters are achieved to provide a secure connection. First, modem 106 must provide a correct user name and password to the server 101 to establish a network connection. Secondly, when applications on server 101 are used, the user of palm device 104 must provide a user name and password to authenticate use. In this configuration, security and authentication is achieved first on the network level by authenticating the user's login name and password or device identification when the modem makes a connection to the network and secondly on the application level by again authenticating the users login name and password.

In these two configurations, a secure authentication process occurs in which two layers of authentication occur. First a network authentication is processed and secondly, an application authentication occurs. At least one of the authentication processes rely on the user supplying a user name and a password and both require network level authentication.

Unfortunately, most wireless communications do not support double authentication. Due to the differences between ECC encryption associated with wireless protocol and SSL encryption associated with traditional IP protocol, security and authentication mechanisms associated with mobile and wireless need to be modified to provide the same level of security as does the traditional land based communications. For example, mobile and wireless devices often access web servers through Internet gateways that provide no assurance of the identity of a device or user. In other words, they provide no network level of security. Intranet security guidelines for most companies usually require both authentication of a device to the network and of a user to each application before access to internal resource can be permitted.

Therefore, there exists a need for a mechanism which allows wireless devices to establish secure and authenticated connections to applications that reside on Intranet networks.

SUMMARY OF THE INVENTION

In accordance with the present invention, a system and method are disclosed to permit portable wireless devices secure and authenticated access to applications that are on an Intranet server. Embodiments of the present invention provide a flexible, inexpensive way for wireless network users to access Intranet applications while protecting Intranet resources (e.g., enterprise resources) against unauthorized access. In addition, the invention does not impose the authentication burden upon individual applications or require the use of application specific middleware or specific mobile application framework.

Embodiments of the present invention include a method and server system for exchanging data between a hand-held wireless electronic device and another computer system. This system allows a wireless electronic device to securely communicate with an Intranet by verifying two authentication parameters to provide network level authentication. The first authentication parameter is the device serial number and a password which authenticates the network connection. The second authentication parameter is a user name and password that authenticates the user's access to applications on the Intranet. In one embodiment of the present invention, the system uniquely integrates the authentication parameters into every query the wireless device makes to the Intranet by adding the parameters to each link that is communicated to the device from the Intranet service. In this configuration, the authentication parameters maintain the session between the wireless device and the Intranet. Beneficially, the authentication parameters are not stored on any particular network device and do not burden either the server or the wireless device with maintaining the session. In another embodiment of the present invention, the server system uses a link rewriter service for examining web pages generated by applications of the Intranet to identify links that point to any application that is resident on the Intranet. Once an Intranet link is queried, the link rewriter uses a look up table in a database to rewrite the link to include a keyword that designates both the targeted application and its Intranet server. If a link is not resident on the Intranet, it will not be rewritten thereby causing it to be executed/routed over the Internet.

More specifically, the present invention includes a server system comprising a network translator for communicating with wireless electronic devices and translating between wireless communication protocol and IP communication protocol. The server system also contains an Intranet comprising a plurality of Intranet servers, each comprising applications. In addition is a proxy server coupled to the network translator and Intranet. The proxy server is for routing queries received from the wireless electronic device to an appropriate server destination and for routing responses to wireless electronic devices. The proxy server comprises a link rewriter service for examining web pages generated by applications of the Intranet to identify links that point to any application that resides in the Intranet, translating each identified link to include a keyword that designates both the targeted application and its Intranet server. The proxy server also comprises a routing service for examining queries sent from the wireless electronic device and for routing queries with recognized keywords to the Intranet and for routing others to the Internet.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 10 is an illustration of a keyword look up table used in one embodiment of the present invention.

DETAILED DESCRIPTION OF THE INVENTION

Figure 1A:
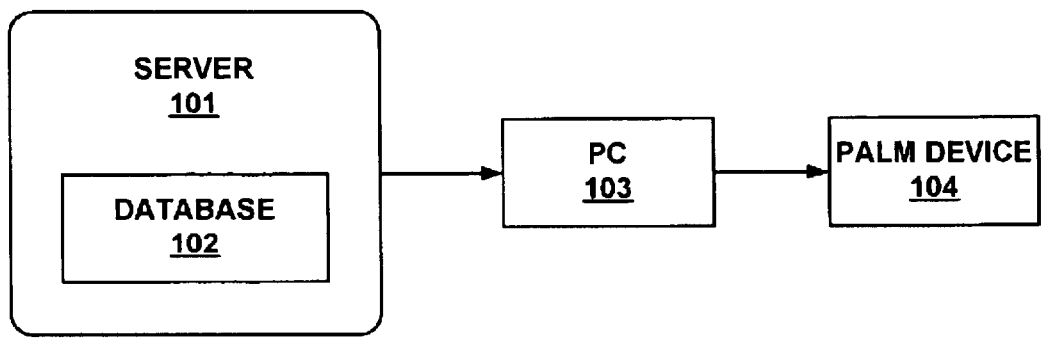
FIG. 1A is a prior art system illustration of a palmtop or "palm sized" computer system connected to other computer systems and the Internet via a cradle device and having network authorization.
Figure 1B:
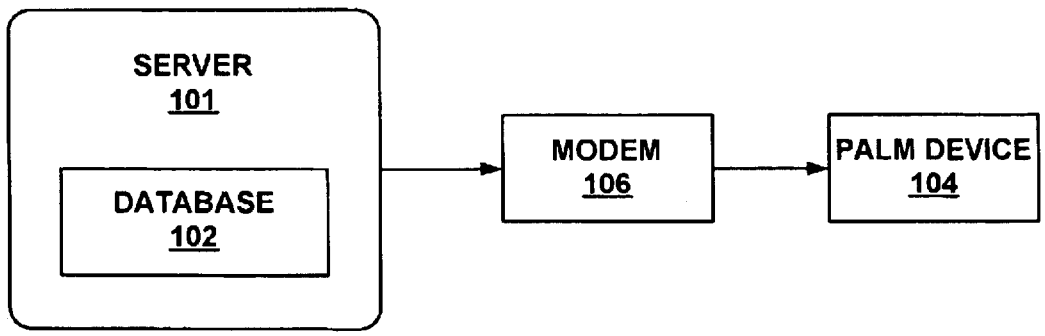
FIG. 1B is a prior art system illustration of a palmtop or "palm sized" computer system connected to other computer systems and the Internet via a modem or dial-up device and having network authorization.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting,""storing," "scanning," "receiving," "sending," disregarding," entering," or the like, refer to the action and processes (e.g., processes 700, 800 and 900) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Although the server system of the present invention may be implemented in a variety of different electronic systems such as a pager, a mobile phone, a calculator, a personal digital assistant (PDA), etc., one exemplary embodiment includes the server system with a portable computing system. It should be understood that the descriptions corresponding to FIGS. 1–4 provide some general information about an exemplary portable computing system.

Figure 2:
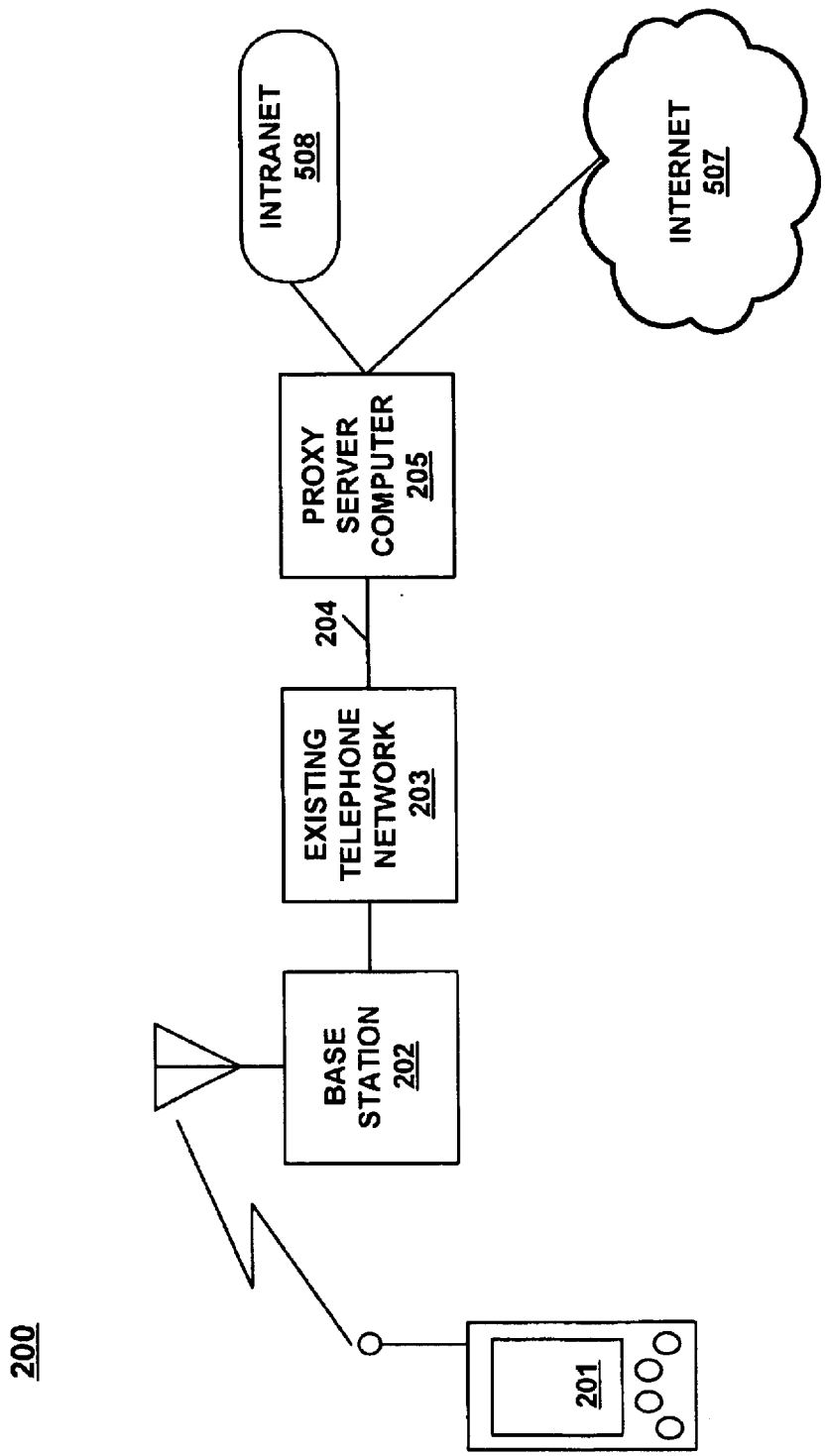
FIG. 2 illustrates a block diagram of an exemplary wireless communication network environment including a wireless electronic device in accordance with an embodiment of the present invention.

FIG. 2 is a block diagram of an exemplary network environment 200 including an exemplary portable electronic system 201 (e.g., a personal digital assistant). The personal digital assistant 201 is also known as a palmtop or palm-sized electronic system. The personal digital assistant 201 has the ability to transmit and receive data and information over a wireless communication interface. The personal digital assistant 201 is one exemplary implementation on which the present invention can operate. The present invention can operate with most portable electronic system/device having wireless communication capabilities.

Base station 202 is both a transmitter and receiver base station which can be implemented by coupling it into an existing public telephone network 203. Implemented in this manner, base station 202 enables the personal digital assistant 201 to communicate with a proxy server computer system 205, which is coupled by wire 204 to the existing telephone network 203. Furthermore, proxy server computer system 205 is coupled to the Internet 507 or with Intranet 508, thereby enabling the personal digital assistant to communicate with the Internet 507 or with an Intranet 508. It should be appreciated that within the present embodiment, one of the functions of the proxy server 205 is to perform operations over the Internet 206 on behalf of the personal digital assistant 201. For example, proxy server 205 has a particular Internet address and acts as a proxy device for the personal digital assistant 201 over the Internet 507. It should be further appreciated that other embodiments of a communications network may be utilized in accordance with the present invention.

The data and information which are communicated between base station 202 and the personal digital assistant 201 are a type of communication and data that can conventionally be transferred and received over a public telephone wire network system. However, a wireless communication wire network system. However, a wireless communication interface is utilized to communicate data and information between the personal digital assistant 201 and the base station 202. It should be appreciated that one embodiment of a wireless communication system in accordance with the present invention is the Cingular wireless communication system.

Figure 3:
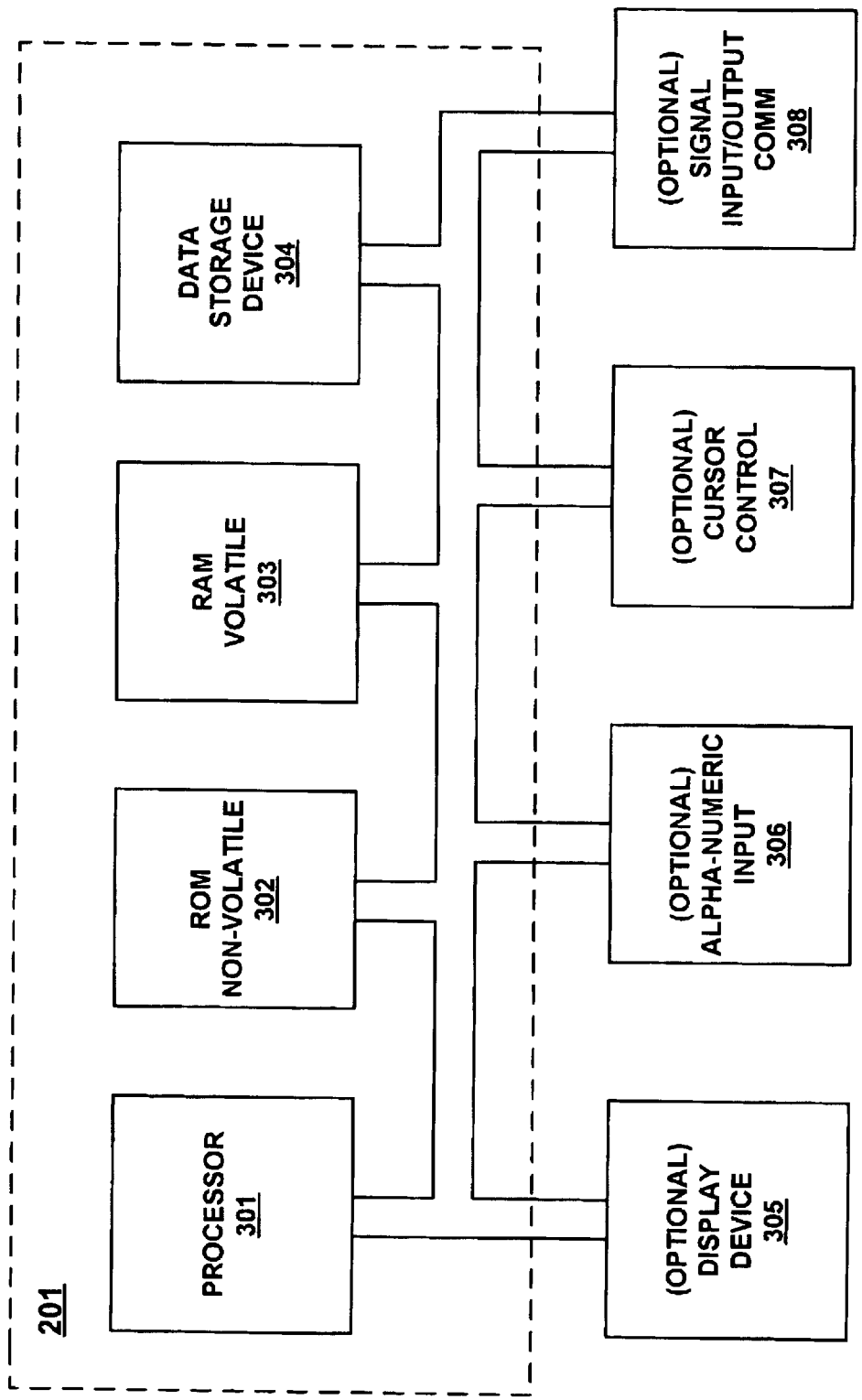
FIG. 3 is a logical block diagram of an exemplary palmtop computer system in accordance with an embodiment of the present invention.

FIG. 3 is a block diagram of exemplary circuitry of portable computing system 201 in accordance with one embodiment of the present invention. The computer system 201 includes a central processor for processing information and instructions. It is appreciated that central processor unit 301 may be a microprocessor or any other type of processor. The computer system 201 also includes data storage features such as a volatile memory 303 (e.g., random access memory, static RAM, dynamic RAM, etc.) for storing information and instructions for the central processor 301 and a non-volatile memory 302 (e.g., read only memory, programmable ROM, flash memory, EPROM, EEPROM, etc.) for storing static information and instructions for the processor 301. Computer system 201 may also include an optional data storage device 304 (e.g., thin profile removable memory) for storing information and instructions. It should be understood that device 304 may be removable. Furthermore, device 304 may also be a secure digital (SD) card reader or equivalent removable memory reader.

Also included in computer system 201 of FIG. 3 is an alphanumeric input device 306 which in one implementation is a handwriting recognition pad ("digitizer") and may include integrated push buttons in one embodiment. Device 306 can communicate information (spatial data and pressure data) and command selections to the central processor 301. The coordinate values (spatial information) and pressure data are then output on separate channels for sampling by the processor 301. In one implementation, there are many different discrete levels of pressure that can be detected by the digitizer 306.

System 201 of FIG. 3 also includes an optional cursor control or directing device 307 for communicating user input information and command selections to the central processor 301. In one implementation, device 307 is a touch screen device (also a digitizer) incorporated with screen 305. Device 307 is capable of registering a position on the screen 305. The digitizer of 306 or 307 may be implemented using well known devices, for instance, using the ADS-7846 device by Burr-Brown that provides separate channels for spatial stroke information and pressure information.

Computer system 201 also contains a flat panel display device 305 for displaying information to the computer user. The display device 305 utilized with the computer system 201 may be a liquid crystal device (LCD), cathode ray tube (CRT), field emission device (FED, also called flat panel CRT), plasma or other display technology suitable for creating graphic images and alphanumeric characters recognizable to the user. In one embodiment, the display 305 is a flat panel multi-mode display capable of both monochrome and color display modes.

Also included in computer system 201 of FIG. 3 is a signal communication device 308 that may be a serial port (or USB port) for enabling system 201 to communicate PC 103. As mentioned above, in one embodiment, the communication interface is a serial communication port, but could also alternatively be of any of a number of well known communication standards and protocols, e.g., parallel, SCSI, Ethernet, FireWire (IEEE 1394), USB, etc. including wireless communication.

In one implementation, the Cingular wireless communication system may be used to provide two way communication between computer system 201 and other networked computers and/or the Internet (e.g., via a proxy server). In other embodiments, transmission control protocol (TCP) can be used or Short Message Service (SMS) can be used.

Figure 4:
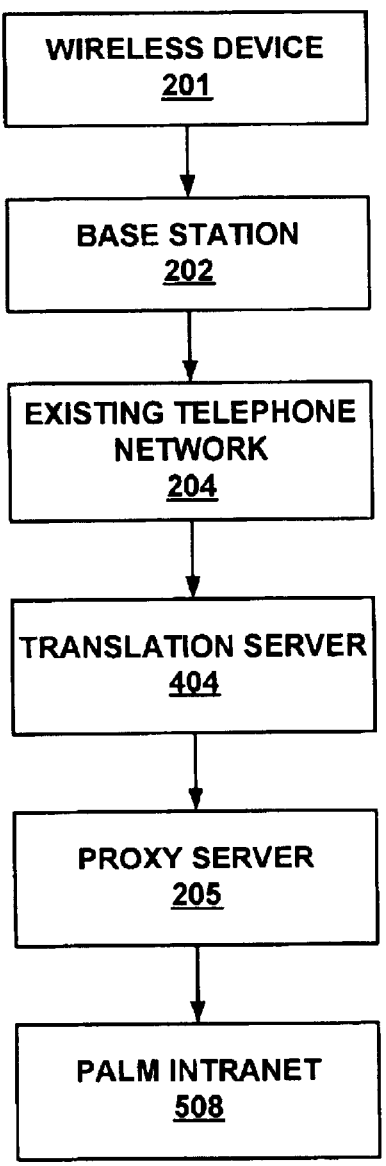
FIG. 4 is a flow diagram showing the sequence and pathway of data communication over an exemplary wireless communication network in accordance with an embodiment of the present invention.

FIG. 4 is a block diagram of a communication pathway in accordance with the present invention. In the present embodiment, the device is a wireless device 201; however, it is appreciated that the wireless device may be another type of intelligent electronic device. FIG. 4 illustrates the flow of data starting with a wireless device 201. From wireless device 201, the data is transmitted to base station 202 where it enters the existing telephone network 204. From the existing telephone network 204, data is transmitted over wire to translation server 404. The translation server 404 is necessary because wireless communications networks operate using a series of wireless protocols and the proxy server 205 communicates using IP protocol. Accordingly, to transfer data from a wireless device 201 to the proxy server 205 network, the communication protocol must be converted by the translation server 404 from wireless protocol to IP protocol. Once the data is converted to IP protocol, the data is sent to proxy server 205 where it then may enter the Intranet 508.

Figure 5:
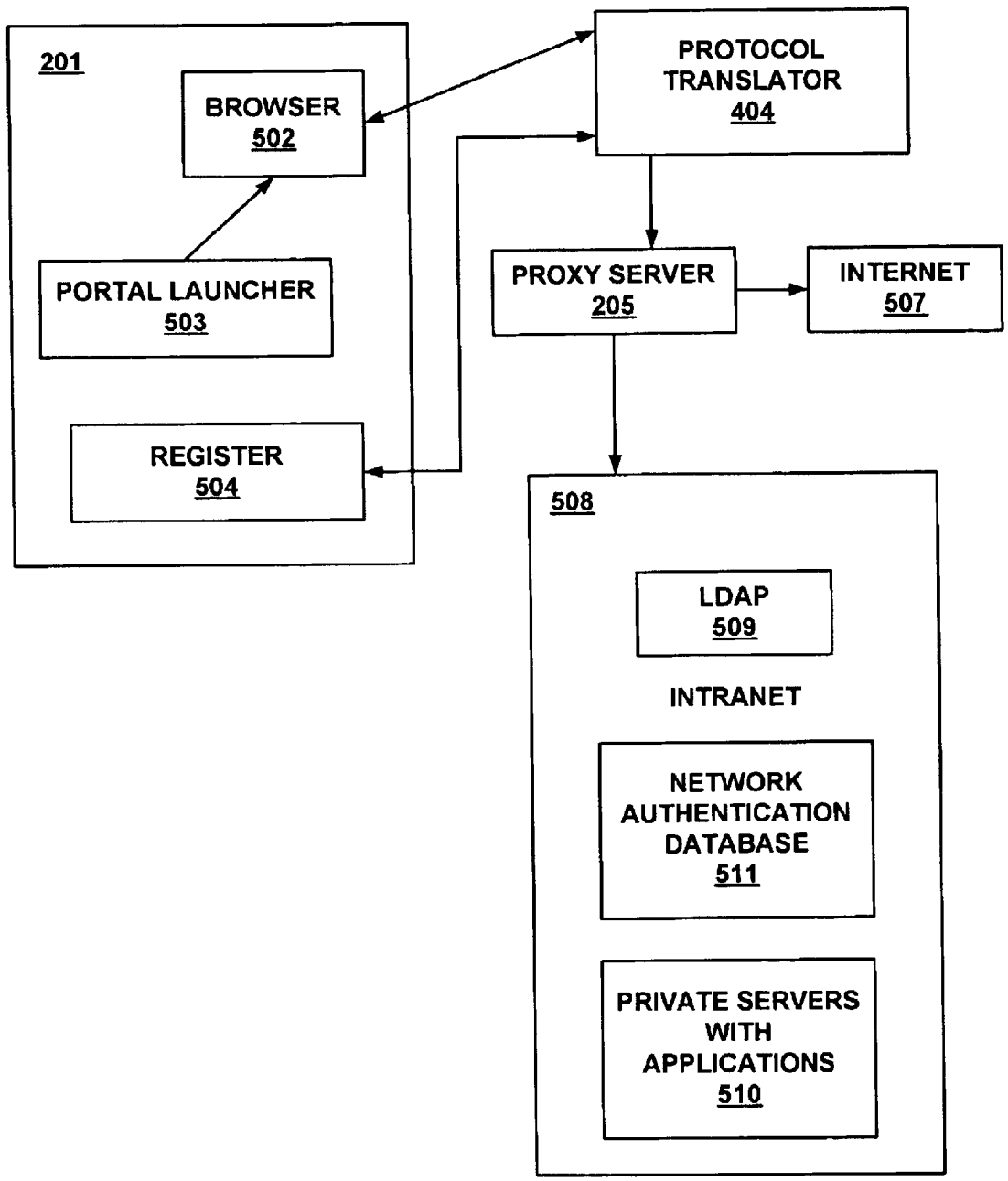
FIG. 5 illustrates a system environment in which embodiments of the present invention can operate including a mobile wireless electronic device and one or more available remotely located resources.

FIG. 5 illustrates a system environment 500 including a mobile wireless electronic device 201 and an Intranet 508 coupled to a proxy server 205, a protocol translator 404 and the Internet 507. Portal launcher 503 is an application that resides on portable wireless electronic device 201 and aids in connecting to the network gateway. The launcher 503 provides authentication parameters to the browser 502. Browser 502 is very similar to a web browser or "minibrowser" used to browse web pages on the Internet. Browser 502 is used to browse wireless communications received on wireless electronic device 201. When Portal launcher 503 executed, an authenticated connection is required to gain a network connection. In the case of one embodiment of the present invention, the serial number belonging to the wireless electronic device 201 in addition to a security password is used to authenticate the network connection on the first message. When the browser application 502 is executed, the portable electronic device 201 transmits the serial number and password via browser 502 to protocol translator 404 and proxy server 205.

Proxy server 205 checks with a database in LDAP 509 to validate that the portable electronic device 201 is a registered user of the network. If the serial number of the portable wireless device 201 is a registered user of the network, the password must match the record in LDAP 509 to secure a network connection. If the serial number of the portable electronic device 201 and/or the password do not match the LDAP 509 database, the device 201 will not be authenticated to use the network 508. If the records in LDAP 509 match the provided authentication parameters, the device 201 will be allowed to communicate over the gateway.

In one embodiment of the present invention, an approved network user has the capability to register a device that is not currently registered with LDAP 509. On the portable electronic device 201, there is an application named register 504. This application allows the user to register a device on LDAP 509 by supplying a user name and password. If the user name and password that are supplied match the user name and password stored in network authentication table 511, the serial number of the device will then be updated in LDAP 509 as a registered device of the network. If the user name and password do not match the record in network authentication table 511, the device 201 will not be registered as an authenticated device on the network. This is described in more detail in FIG. 9.

Figure 6:
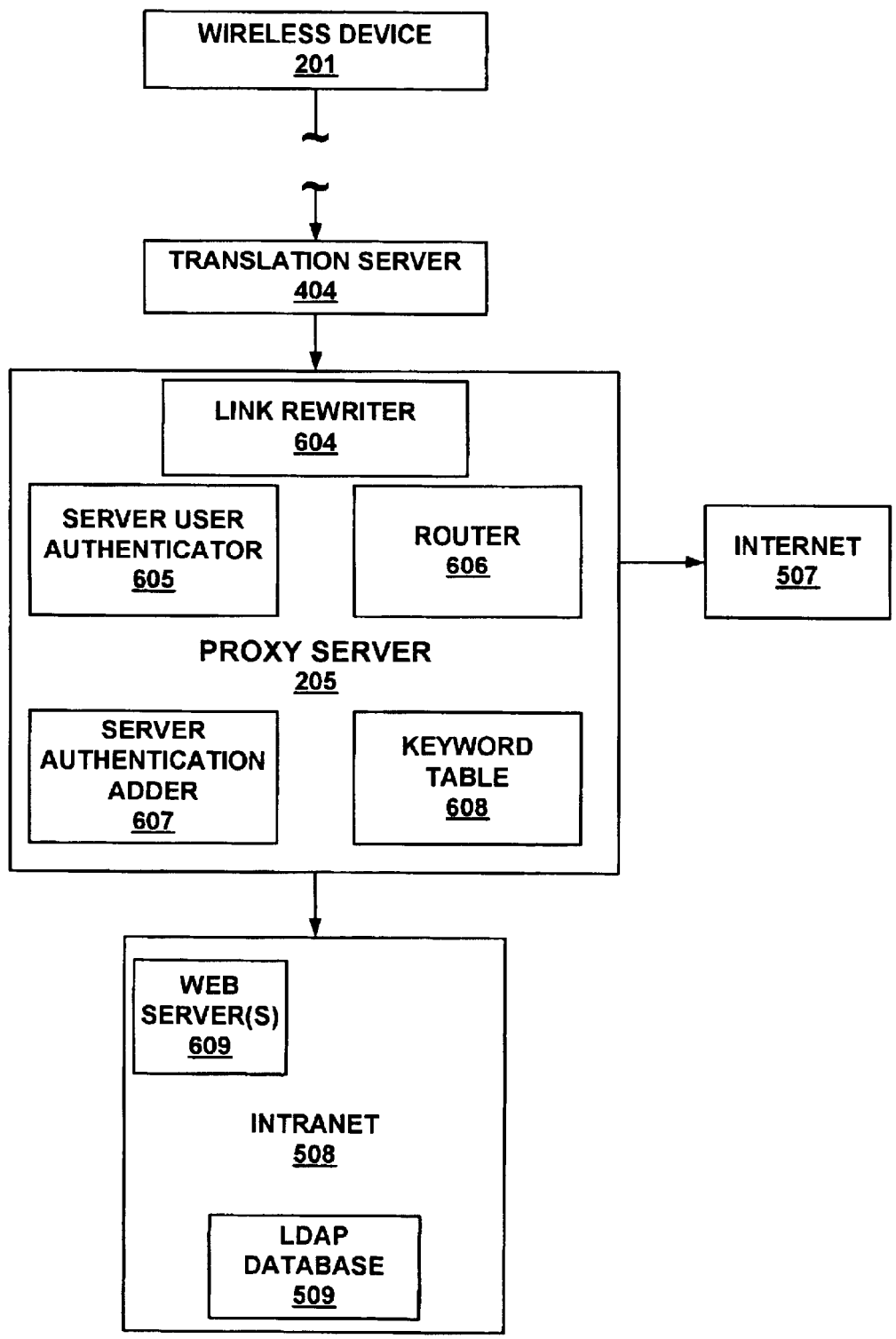
FIG. 6 illustrates a system environment in which embodiments of the present device can operate including a proxy server containing one or more system based applications.

Now referring to FIG. 6 which represents a system 600 illustrating the components of proxy server 205 that include link rewriter 604, server user authenticator 605, router 606, server authentication adder 607 and keyword table 608. In FIG. 6, proxy server 205 is coupled to translation server 404, Intranet 508 and the Internet 507. System 600 includes a uniquely intelligent active proxy server 205 designed to operate between a web client device (or gateway representing such a device) and a non-Internet accessible corporate network ("Intranet") 508 containing one or more web servers 609. Proxy server 205 accepts authentication parameters provided by wireless device 201 as a query or form parameter in HTTP. The authentication parameters could include, but are not limited to, the serial number of wireless device 201 and a password. The authentication parameters are the basis of the authenticated session and every authenticated query must contain the authentication parameters either as GET query parameters or form variables to maintain a session. Server user authenticator 605 checks the authentication parameters against an internal LDAP 509 database which maps user-names to authorized serial numbers, and permits only queries with valid authentication parameters.

Proxy server 205 also efficiently examines and potentially alters every URL found in content returned from internal web servers 609 so that each URL hosted with the Intranet 508 appears relative to proxy server 205 when viewed on wireless device 201. When content returned from Intranet 508 (from the wireless device) contains URLs, link rewriter 604 only rewrites links that target the Intranet 508. Links that reside on Internet 507 will be routed by router 606 to Internet 507. Router 606 is responsible for recognizing links that reside on Intranet 508 and routing them to link rewriter 604.

When Link rewriter 604 receives a web page from the Intranet 508, it examines links therein. When the rewriter 604 sees a link that targets the Intranet 508, it looks to keyword table 608 to match the path of the link's URL to the appropriate table URL to rewrite the link with. The rewritten link then includes a keyword that designates the application and the Intranet server that hosts the application. Keyword table 608 contains a database of appropriate keywords for the links (applications) that reside on Intranet 508. When prompted by link rewriter, the keyword table uses the URL in the link as an index and locates a corresponding keyword and rewrites the URL in the returned rewritten link. The rewritten link uses the keyword to point to the correct application and server on Intranet 508. This feature makes the link rewriting process seamless to the user of wireless device 201.

Server authentication adder 607 appends the original authentication parameters to each link in any returned content, causing an authenticated session state to persist between queries. Beneficially, server authentication adder 605 maintains an authenticated session without requiring any storage of session state in the application or in proxy server 205. The session state is stored in the queries between wireless device 201 and proxy server 205.

Figure 7:
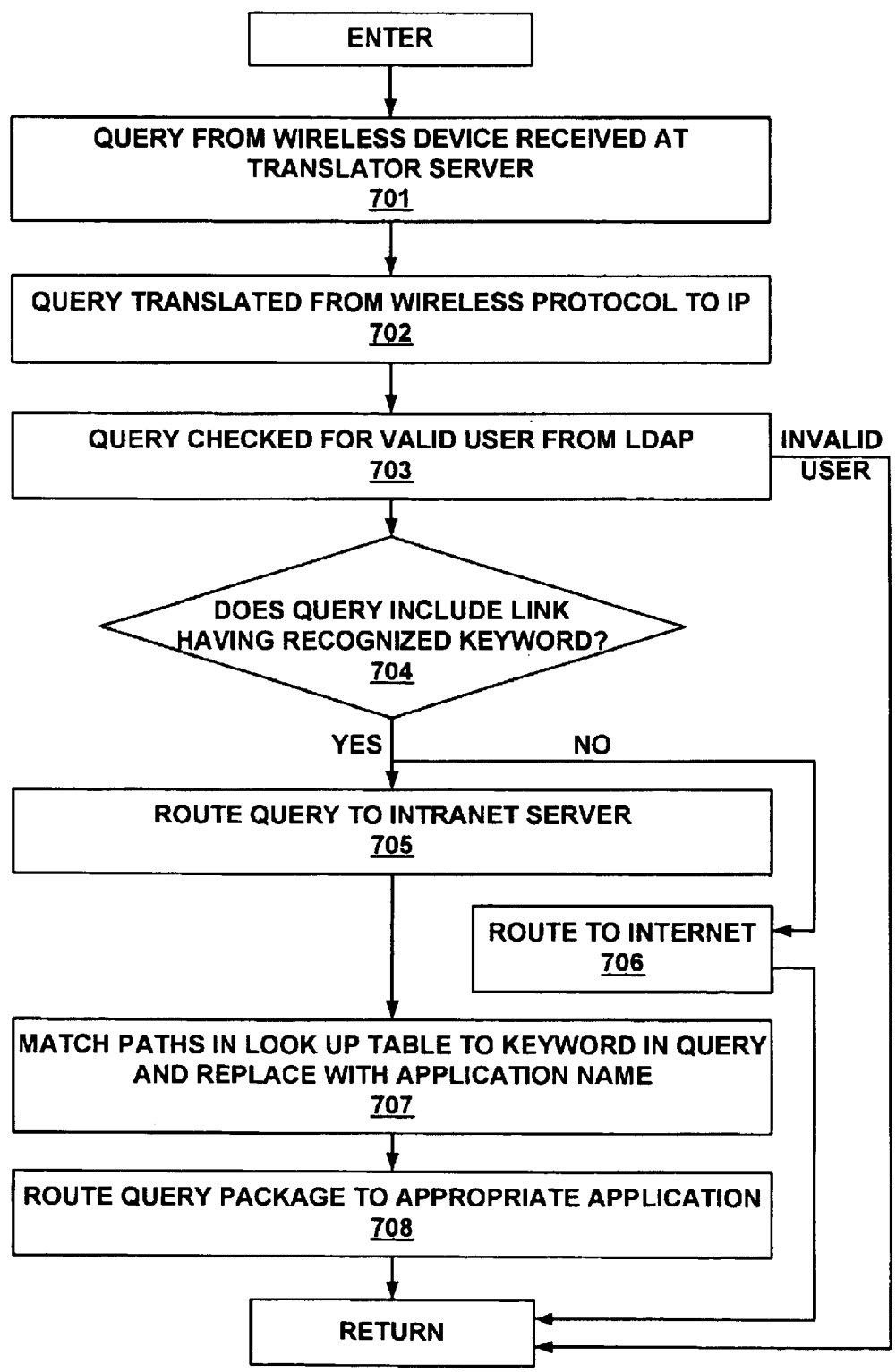
FIG. 7 is a flow diagram illustrating a discovery process of one embodiment of the present invention for discovering if a query includes a recognized link for Intranet data accessing and routing the query accordingly.

FIG. 7 is a flow diagram illustrating a process 700 of link rewriting and routing for links received from a wireless electronic device, e.g., a "query." In FIG. 7, in the first step 701, the translator server receives a query from wireless device 201. The query (containing a link), is translated from wireless communications protocol (and encryption) to IP protocol (and encryption) in the second step 702. Once translated, the query is checked by the proxy server 205 using LDAP 509 to determine if the device 201 is a registered device and the supplied password is correct 703. If device 201 is not registered, a network connection will not be established. If the user is an authorized user, they will then have the option of registering the device using registration application 504. If the authentication parameters are authenticated, a network connection will be established and the proxy server 205 will examine the query to see if it contains a link having a recognized keyword 704. Keywords are used to determine if a link targets the Intranet or the Internet.

Proxy server 205 then completes the step 704 of checking if the query includes a link having a recognized keyword. Recognized keywords are stored in keyword look up table 608 that contains the appropriate keyword and the corresponding file path to the server on the Intranet. If a link includes a recognized keyword, the query is routed to the Intranet 508 not the Internet 507. If the query does not contain a recognized keyword, the query is routed to the Internet 507. Once a query containing a recognized keyword is routed to the Intranet 508, keyword look up table 608 obtains the corresponding file path of the URL to the recognized keyword in the keyword look up table 608. The link can now be rewritten with the corresponding top level pathway to the correct application and web server on the Intranet. Once the link has been rewritten, the query is routed to the appropriate Intranet web server 609 and application.

Figure 8:
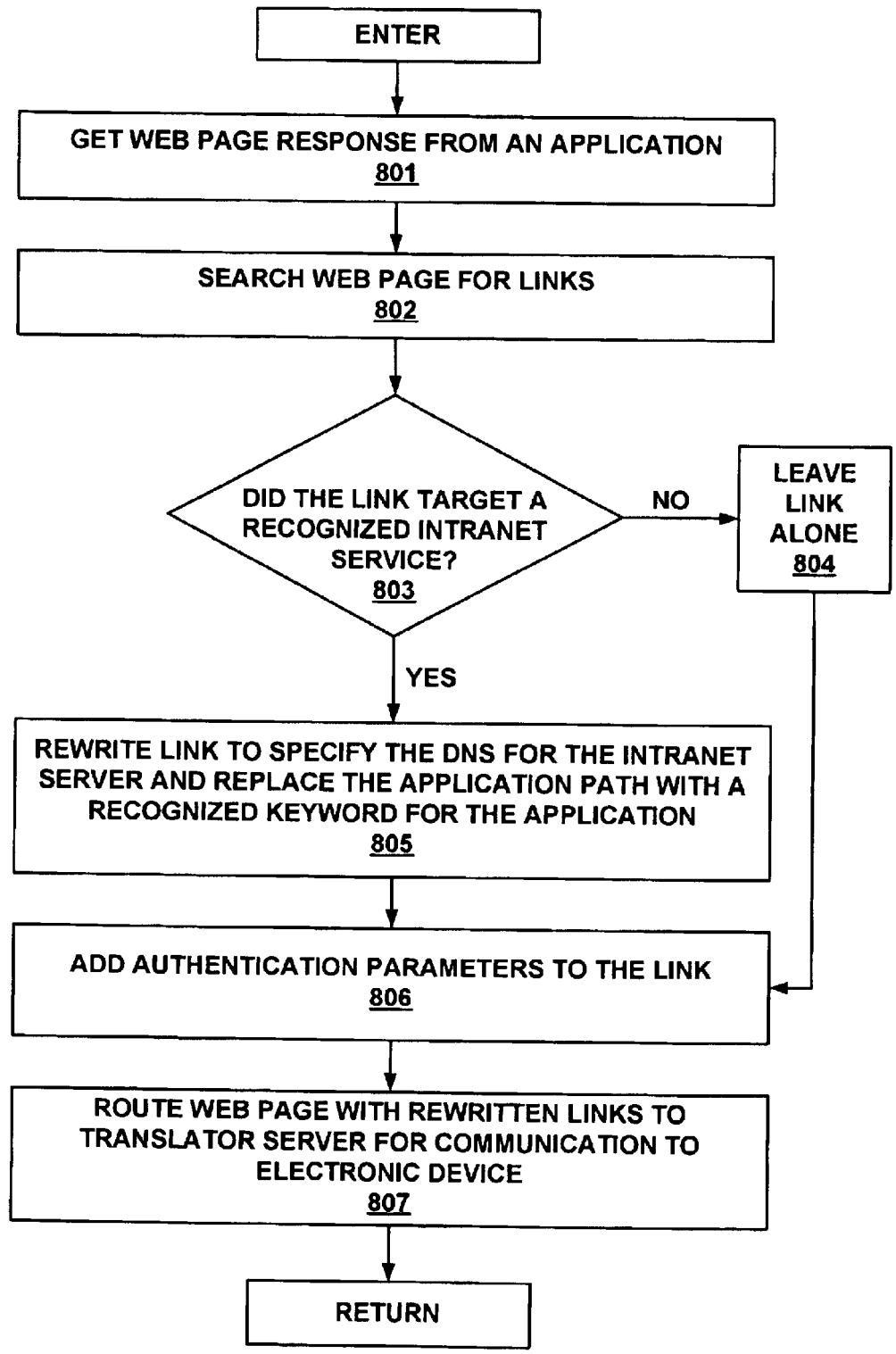
FIG. 8 is a flow diagram illustrating a link rewriting process of one embodiment of the present invention for rewriting specific links to specify the Intranet server(s).

FIG. 8 represents a flow diagram of the link rewriting process 800 for rewriting specific links to specify the correct web server. The link rewriting process 800 begins when proxy server 205 receives a web page response from an application 801 of the Intranet and the web page is scanned for links 802. The proxy server 205 decides whether the links point to a server on the Intranet 508 or on the Internet 507. If a link does not target on the Intranet 508, at step 804 and step 806, the link is not rewritten and is routed to the Internet. If the link contains a recognizable path to the Intranet 508 and the link resides on a server on the Intranet 508, at step 805, the proxy server 205 uses the keyword table to rewrite the link to specify a particular keyword corresponding to the correct application and server on the Intranet. Once the link has been rewritten, proxy server 205 adds the authentication parameters, originally attached to the initial query that generated the web page, to the link 806. The query is then routed to the translator server for wireless communication with the electronic device 807. In this configuration, the authentication parameters maintain the session between the wireless device and the Intranet. Beneficially, the authentication parameters are not stored on any particular network device and do not burden either the server or the wireless device with maintaining the session.

When the user of the wireless device clicks on a rewritten link containing a recognized keyword, the proxy server decides where to target the link (e.g., to the Intranet) by using the keyword look up table to find the pathway that corresponds to the recognizable keyword. With the corresponding pathway, the query is routed to the correct web server on the Intranet. Without a keyword, the query is forwarded over the Internet.

Figure 9:
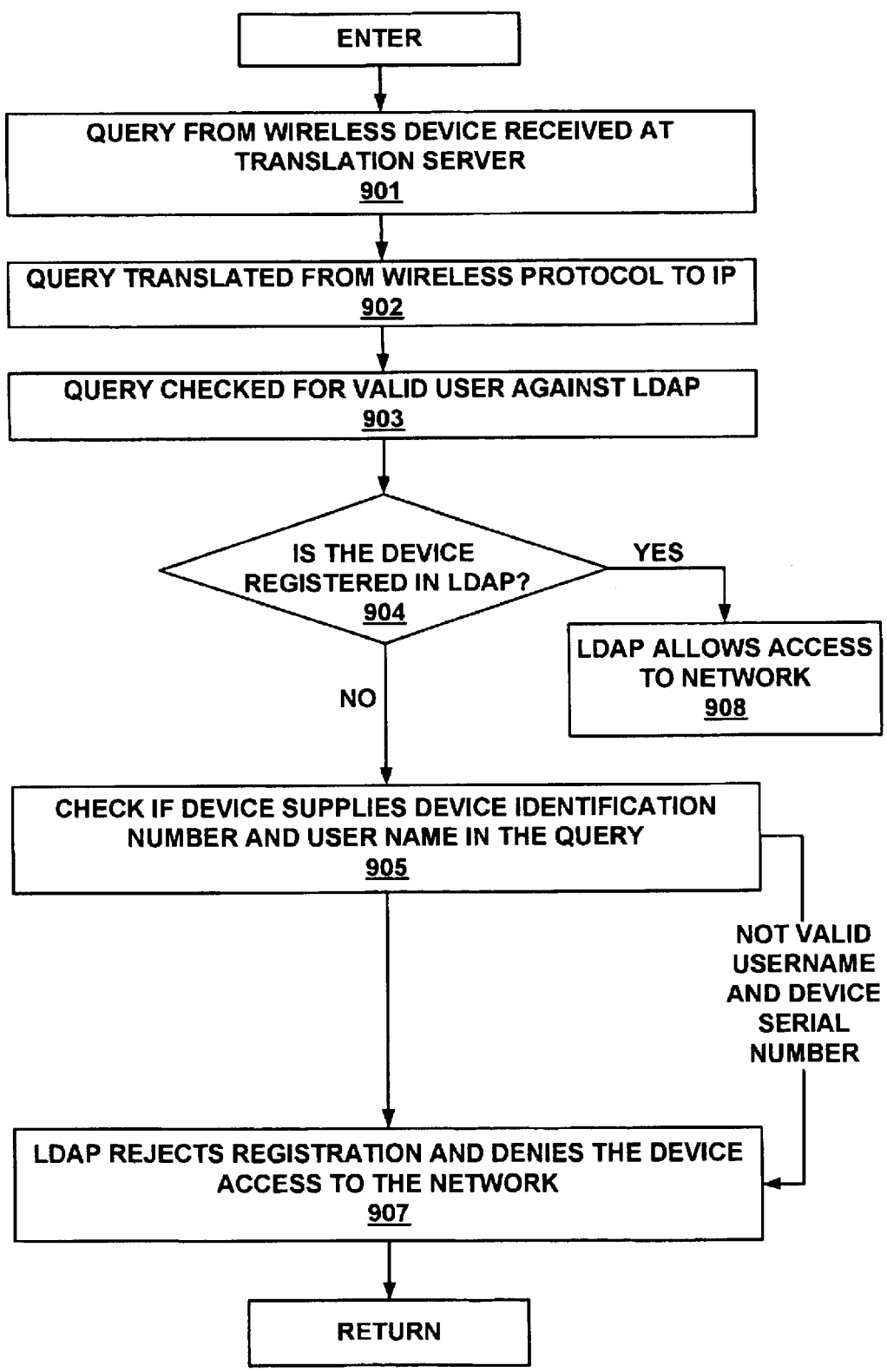
FIG. 9 is a flow diagram illustrating a registration process of one embodiment of the present invention for registering a device to have network access on the network gateway.

FIG. 9 represents a flowchart 900 of the process of registering a device with the LDAP database. When an authorized user desires to establish a network connection between the Intranet and a wireless device not registered as an authorized network device, they have the option to register the device with the LDAP database of the Intranet. When a query from a wireless device is received at the translation server 404, it is translated from wireless communication protocol to IP 902. The query is then checked for authentication parameters before a network connection can be established 903. The authentication server looks to the LDAP server to see if the device is authorized 904. If the serial number of the device and the password match the record in LDAP, the connection in established and the user will have access to the Intranet 508. If the device is not registered, authentication will fail and the device will not establish a network connection with the Intranet 508.

At any point, the user has the option to register the device if they are a registered user of the Intranet. A registration application can be used to register the device. The registration application transmits a query to the proxy server 205. The query contained the device serial number, a login name and a password. The authentication parameters are checked against network authentication table 511. If the login name and password match the record in network authentication table 511, the serial number will be added in the network authentication tables and the device will now be a registered device 906. If the login name and password do not match the network authentication table record for the user, access will be denied and the device will not be registered as an authorized device 907.

FIG. 10 illustrates a keyword look up table 608 that is used to rewrite links that target web servers on an Intranet. As mentioned above, the link rewriting process begins when proxy server 205 receives a web page response from an application of the Intranet and the web page is scanned for links. The proxy server 205 determines whether the link targets a server on the Intranet 508 or on the Internet 507. If a link does not target an application on the Intranet 508, the link is not rewritten. If the link contains a recognizable path to the Intranet 508 from the keyword look up table and the link originated on a server on the Intranet 508, the proxy server 205 rewrites the link to specify a particular keyword (from the key word look up table) corresponding to the file path and replaces the path with the recognized keyword 805. The rewritten link is then returned to the wireless device. The keyword look up table contains keywords and corresponding pathways for all links and applications that reside on the Intranet web servers.

As such, keyword table 608 contains individual entries each having keywords and associated file paths, e.g., keyword 1001 is associated with filepath 1002, ect. For exemplary entries are shown in FIG. 10.

The preferred embodiment of the present invention, a proxy server system for providing portable wireless devices authenticated access to an Intranet, is thus described. While the present invention has been described in particular embodiments, it should be appreciated that the present invention should not be construed as limited by such embodiments, but rather construed according to the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A server system comprising:
a network translator for communicating with wireless electronic devices and translating between a wireless communication protocol and an IP communication protocol;
an Intranet comprising a plurality of Intranet servers, each Intranet server comprising applications;
a proxy server coupled to said network translator and said Intranet and for routing queries received from said wireless electronic devices to an appropriate server destination and also for routing responses to said wireless electronic devices, said proxy server comprising:
a link rewriter service for examining web pages generated by applications of said Intranet to identify links that point to any application that is resident in said Intranet, said link rewriter service also for translating each identified link to include a keyword that designates both the targeted application and its Intranet server; and
a router service for examining queries sent from said wireless electronic devices and for routing queries with recognized keywords to said Intranet and for routing others to the Internet.

2. A server system as described in claim 1 wherein said proxy server also comprises an authentication adder service for adding authentication parameters to said links that target any application that is resident in said Intranet.

3. A server system as described in claim 2 wherein said authentication parameters include a user name and a device serial number.

4. A server system as described in claim 1 further comprising a keyword database in which each recognized keyword has an associated URL that specifies an Intranet server and an application within said Intranet server.

5. A server system as described in claim 1 wherein said proxy server is also coupled to the Internet.

6. A server system as described in claim 1 wherein said network translator translates between wireless protocol and said IP protocol.

7. A server system as described in claim 1 wherein said proxy server also comprises an authentication user service for confirming received queries as being associated with an valid user based on a database of valid user information.

8. A server system comprising:
a translator means for communicating with wireless electronic devices and translating between a wireless communication protocol and an IP communication protocol;
a routing means for examining queries sent from said wireless electronic devices and for routing queries with recognized keywords to said Intranet and for routing others to the Internet;
an Intranet comprising a plurality of Intranet servers, each Intranet server comprising applications;
a proxy server coupled to said translator means, said routing means, and said Intranet, said proxy server including:
link rewriting means for examining web pages generated by applications of said Intranet to identify links that point to any application that is resident in said Intranet, said link rewriting means also for translating each identified link to include a keyword that designates both the targeted application and its Intranet server.

9. A server system as described in claim 8 wherein said proxy server also comprises an authentication adder means for adding authentication parameters to said links that target any application that is resident in said Intranet.

10. A server system as described in claim 9 wherein said authentication parameters include a user name and a device identifying number.

11. A server system as described in claim 8 further comprising a keyword database in which each recognized keyword has an associated file path that specifies an Intranet server and an application within said Intranet server.

12. A server system as described in claim 8 wherein said proxy server is also coupled to the Internet.

13. A server system as described in claim 8 wherein said translator means translates between ECC wireless protocol and said IP protocol.

14. A server system as described in claim 8 wherein said proxy server also comprises an authentication user means for confirming received queries as being associated with an valid user based on a database of valid user information.

15. In a server system, a method of communicating with wireless electronic devices comprising the steps of:
a) receiving a web page representing a response to a query sent by a wireless electronic device, said web page generated by an application residing in an Intranet that comprises a plurality of Intranet servers, each having applications;
b) identifying links within said web page that point to any application of said Intranet;
c) for links identified in step b), rewriting each identified link to include a keyword that designates both the targeted application and its Intranet server;
d) routing rewritten links to an appropriate wireless electronic device; and
e) for queries received by said server system and sent by said wireless electronic devices, routing those queries having a recognized keyword to said Intranet and otherwise routing received queries to the Internet.

16. A method as described in claim 15 wherein said step c) further comprises the step of adding authentication parameters to links generated from said applications of said Intranet server.

17. A method as described in claim 16 wherein said authentication parameters include a user name and a device serial number.

18. A method as described in claim 16 further comprising a keyword database in which each recognized keyword has an associated URL that specifies an Intranet server and an application within said Intranet server.

19. A method as described in claim 18 wherein said step e) further comprises the steps of:
analyzing said queries for keywords that match a keyword database;
replacing recognized keywords with the corresponding file pathways from said keyword database; and
routing said links to appropriate applications of said Intranet as indicated by said file pathways.

20. A method as described in claim 15 further comprising the step of performing a protocol translation on received queries between an ECC wireless protocol and said IP protocol.

21. A method as described in claim 15 further comprising the step of confirming received queries as being associated with an valid user based on a database of valid user information.

* * * * *